US012747162B2

(12) United States Patent
Lee et al.

(10) Patent No.: US 12,747,162 B2
(45) Date of Patent: Sep. 29, 2026

(54) METHOD FOR PRODUCING LITHIUM HYDROXIDE

(71) Applicant: DONGWOO FINE-CHEM CO., LTD., Jeollabuk-do (KR)

(72) Inventors: Ji-Hoon Lee, Gyeonggi-do (KR); Myung-Jin Kim, Gwangju (KR); Bong-Jin Choi, Chungcheongnam-do (KR)

(73) Assignee: DONGWOO FINE-CHEM CO., LTD., Jeollabuk-do (KR)

(*) Notice: Subject to any disclaimer, the term of this patent is extended or adjusted under 35 U.S.C. 154(b) by 1025 days.

(21) Appl. No.: 17/909,042

(22) PCT Filed: Oct. 19, 2020

(86) PCT No.: PCT/KR2020/014255
§ 371 (c)(1),
(2) Date: Sep. 2, 2022

(87) PCT Pub. No.: WO2021/177537
PCT Pub. Date: Sep. 10, 2021

(65) Prior Publication Data

US 2023/0093576 A1 Mar. 23, 2023

(30) Foreign Application Priority Data

Mar. 5, 2020 (KR) ........................ 10-2020-0027656

(51) Int. Cl.
*C01D 15/02* (2006.01)
*H01M 10/54* (2006.01)

(52) U.S. Cl.
CPC ............ *C01D 15/02* (2013.01); *H01M 10/54* (2013.01)

(58) Field of Classification Search
None
See application file for complete search history.

(56) References Cited

FOREIGN PATENT DOCUMENTS

| | | | | |
|---|---|---|---|---|
| CN | 102659144 | | 9/2012 | |
| CN | 102676827 A | | 9/2012 | |
| CN | 102786069 | | 11/2012 | |
| CN | 104538696 A | | 1/2015 | |
| CN | 109449523 A | * | 3/2019 | ........... C22B 3/3842 |
| CN | 109761251 A | | 5/2019 | |
| CN | 110013822 A | | 7/2019 | |
| CN | 110127729 A | | 8/2019 | |
| CN | 110790289 A | | 2/2020 | |
| JP | 2003-027151 A | | 1/2003 | |
| JP | 2012-106874 A | | 6/2012 | |
| JP | 2019-536888 A | | 5/2018 | |
| KR | 10-0725589 B | | 5/2007 | |
| KR | 10-2011-0004303 A | | 1/2011 | |

(Continued)

OTHER PUBLICATIONS

English translation of CN-109449523-A Description. (Year: 2019).*

(Continued)

*Primary Examiner* — Anthony J Zimmer
*Assistant Examiner* — Zachary John Baum
(74) *Attorney, Agent, or Firm* — Brooks, Cameron & Huebsch, PLLC

(57) ABSTRACT

The present disclosure relates to a method for producing high-purity lithium hydroxide from a lithium-containing waste liquid of a spent lithium secondary battery.

6 Claims, 1 Drawing Sheet

(g/L = g $Ca(OH)_2$ per liter of solution)

(56) References Cited

FOREIGN PATENT DOCUMENTS

| | | | | | |
|---|---|---|---|---|---|
| KR | 10-2015-0124421 A | | 11/2015 | | |
| KR | 10-2016-0002578 A | | 1/2016 | | |
| KR | 20170052012 A | * | 5/2017 | ............. | H01M 4/13 |
| KR | 101835038 | | 3/2018 | | |

OTHER PUBLICATIONS

English translation of CN-110790289-A Description. (Year: 2020).*
English translation of CN-102659144-A Description. (Year: 2012).*
English translation of Kr 10-0725589-B1 Description. (Year: 2007).*
English translation of CN 109761251 A Description. (Year: 2019).*
Cleveland, Cutler J. Morris, Christopher. (2009). Dictionary of Energy (Expanded Edition)—Solvent.(pp. 474). Elsevier. Retrieved from https://app.knovel.com/hotlink/pdf/id:kt007SY9X5/dictionary-energy-expanded/saint-elmos-fire. (Year: 2009).*
International Food Information Service. (2009). Dictionary of Food Science and Technology (2nd Edition)—Solvents. (pp. 393). International Food Information Service (IFIS Publishing). Retrieved from https://app.knovel.com/hotlink/pdf/id:kt006QF8I1/dictionary-food-science/safflowers. (Year: 2009).*
Sigma-Aldrich. Isopropanol 70 H2O 67-63-0 (2025). Accessed electronically at https://www.sigmaaldrich.com/US/en/product/sigald/563935 on Aug. 8, 2025. (Year: 2025).*
English translation of KR-20170052012-A Description. (Year: 2017).*
International Search Report and Written Opinion from related PCT Application No. PCT/KR2020/014255, dated Oct. 19, 2020, 8 pages.

* cited by examiner

Solubility of the slaked lime according to the temperature
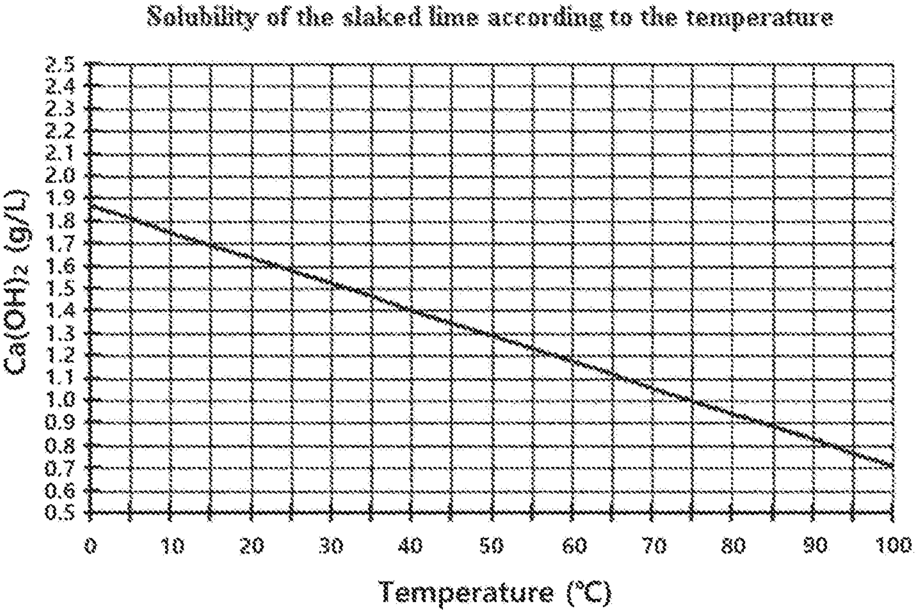
(g/L = g $Ca(OH)_2$ per liter of solution)

METHOD FOR PRODUCING LITHIUM HYDROXIDE

BACKGROUND OF THE DISCLOSURE

Field of the Disclosure

The present disclosure relates to a method for producing high-purity lithium hydroxide from a lithium-containing waste liquid of a spent lithium secondary battery.

Description of Related Art

As technology developments and demands for various types of energy storage devices from ultra-small to medium-large such as mobile devices, notebook computers, wireless devices, electric vehicles and electric motorcycles increase, demands for secondary batteries as an energy source is rapidly increasing. Among such secondary batteries, lithium secondary batteries exhibiting high energy density and operating potential, and having; a long cycle lifetime and a low self-discharge rate have been commercialized and widely used.

As lithium secondary batteries are increasingly produced and used, the amount of waste will increase, and the need for technologies of reprocessing and recycling spent lithium secondary batteries to treat the waste is emerging. In addition, the secondary battery and material-related industry is in desperate need for efforts such as low-priced raw materials, low-priced processes and yield improvements due to intense competition in price, and demands for secondary batteries are increasing. Accordingly, attempts to recycle spent batteries after use, and defective products, electrodes and the like generated in the manufacturing process have increased, and as demands for lithium rapidly increase as well, technology developments for methods of recovering high-purity lithium hydroxide, an essential material of lithium secondary batteries, in a high yield have been required.

In order to produce lithium hydroxide from a lithium waste liquid, sulfate ion removal is essential. In this regard, Korean Patent Application Laid-Open No. 10-2016-0002578 discloses a method for producing lithium hydroxide from lithium sulfate using barium hydroxide. However, recovery of lithium hydroxide from a lithium waste liquid is not disclosed therein, and using barium hydroxide to remove sulfate ions has problems of long reaction time, and reducing purity and yield of obtained lithium hydroxide due to remaining barium in the solution. Meanwhile, calcium hydroxide used for sulfate ion precipitation in the art has low solubility for water, and has a problem in that forming precipitates with sulfate ions is difficult unless a separate treatment is conducted to enhance solubility.

RELATED ART DOCUMENT

Patent Document (Patent Document 1) Korean Patent Application Laid-Open No. 10-2016-0002578

SUMMARY OF THE DISCLOSURE

The present disclosure has been made in order to improve technical problems in the art described above, and is directed to providing a method for producing high-purity lithium hydroxide in a high yield from a lithium-containing waste liquid without using separate additives.

However, the problems that the present application is seeking to address are not limited to the problems described above, and other problems not mentioned herein will be clearly understood by those skilled in the art from the following descriptions.

In view of the above, one embodiment of the present disclosure provides a method for producing lithium hydroxide, the method including Obtaining lithium sulfate from a lithium-containing waste liquid; and obtaining lithium hydroxide by reacting the lithium sulfate with calcium hydroxide wherein the lithium sulfate obtained from the lithium-containing waste liquid has a pH of 6 or less.

Advantageous Effects

A method for producing lithium hydroxide according to the present disclosure is capable of producing high-purity lithium hydroxide in a high yield from a lithium-containing waste liquid without using separate additives such as a phosphorous-containing material a pH adjusting agent or glycerin. In addition the process for producing lithium hydroxide can be simplified since there is no separate process for removing additives.

In addition, with the lithium-containing waste liquid of the present disclosure, an aqueous lithium sulfate solution having the pH adjusted to 6 or less can be obtained without a separate additive for adjusting the pH through a process of evaporation concentrating and then cooling crystallizing the lithium-containing waste liquid from which valuable metals such as manganese, cobalt and nickel are separated and recovered. In addition, the aqueous lithium sulfate solution and calcium hydroxide are reacted to obtain an aqueous lithium hydroxide solution, and from the aqueous lithium hydroxide solution, lithium hydroxide powder can be obtained by a low-temperature process using an alcohol precipitant such as isopropanol.

BRIEF DESCRIPTION OF DRAWINGS

FIG. 1 shows solubility of calcium hydroxide depending on a temperature.

DESCRIPTION OF SPECIFIC EMBODIMENTS

The present disclosure relates to, as a method for obtaining high-purity lithium hydroxide in a high yield from a spent lithium secondary battery, a method for producing lithium hydroxide, the method including obtaining lithium sulfate from a lithium-containing waste liquid of a spent lithium secondary battery, and obtaining lithium hydroxide by reacting the lithium sulfate with calcium hydroxide.

The method for producing lithium hydroxide according to the present disclosure is capable of producing high-purity lithium hydroxide in a high yield from a lithium-containing waste liquid without using separate additives such as a phosphorous-containing material, a pH adjusting agent or glycerin, and the process for producing lithium hydroxide may be simplified since there is no separate process for removing additives.

In addition, with the lithium-containing waste liquid of the present disclosure, an aqueous lithium sulfate solution having the pH adjusted to 6 or less may be obtained without a separate additive for adjusting the pH through a process of evaporation concentrating and then cooling crystallizing the lithium-containing waste liquid from which valuable metals such as manganese, cobalt and nickel are separated and recovered. In addition, the aqueous lithium sulfate solution and calcium hydroxide are reacted to obtain an aqueous lithium hydroxide solution, and from the aqueous lithium hydroxide solution, lithium hydroxide powder may be obtained by a low-temperature process using an alcohol precipitant such as isopropanol.

Hereinafter the method for producing lithium hydroxide according to the present disclosure will be described in detail. However, the present disclosure is not limited thereto.

<Method for Producing Lithium Hydroxide>

The method for producing lithium hydroxide of the present disclosure includes obtaining lithium sulfate from a lithium-containing waste liquid; and obtaining lithium hydroxide by reacting the lithium sulfate with calcium hydroxide, wherein the lithium sulfate obtained from the lithium-containing waste liquid has a pH of 6 or less. In addition, the method for producing lithium hydroxide of the present disclosure may further include obtaining the lithium-containing waste liquid from a spent lithium secondary battery, pretreating the lithium-containing waste liquid, and preparing lithium hydroxide powder.

(1) Obtaining Lithium Sulfate from Lithium-Containing Waste Liquid

The method for producing lithium hydroxide of the present disclosure includes obtaining lithium sulfate from a lithium-containing waste liquid.

The method may further include, before the obtaining of lithium sulfate, recovering one or more types of metal salts selected from among manganese, nickel and cobalt from the lithium-containing waste liquid. Herein, the lithium-containing waste liquid may mean valuable metals such as manganese, cobalt and nickel being separated and recovered from a spent lithium secondary battery.

As one example, the metal salt may be recovered by solvent extraction or precipitation in the present disclosure, and in the solvent extraction, a phosphoric acid-based material such as di-(2-ethylhexyl)phosphoric acid, di-(2-ethylhexyl)phosphonic acid or bis-(2,4,4-trimethylpentyl)phosphonic acid, or a carboxyl-based material such as neodecanoic acid may be used, and in the precipitation, an oxime-based material such as dimethylglyoxime, diethylglyoxime, dipropylglyoxime or ethylmethylglyoxime may be used, however, the materials are not limited thereto.

In the process of obtaining lithium sulfate from a lithium-containing waste liquid, an alkali material and sulfuric acid are used for recovering metal salts and the like, and the lithium sulfate obtained through the above-mentioned process may have a pH value of 6 or less without special treatment. Artificially lowering the pH results in decreases in purity and yield, and artificially increasing the pH leads to an increase in the Na content, resulting in problems of impurities and decreases in purity/yield. For example, at least one or more types selected from the group consisting of NaOH, KOH, $Ca(OH)_2$ and $NH_4OH$ may be used as the alkali material, and using NaOH is most preferred.

In one embodiment, when using sodium hydroxide as the alkali material to separate and recover metal salts in the process of obtaining lithium sulfate from a lithium-containing waste liquid, the sulfuric acid solution and the sodium hydroxide may react to produce sodium sulfate, an impurity.

The obtaining of lithium sulfate from a lithium-containing waste liquid may further include removing the sodium sulfate ($Na_2SO_4$) by evaporation concentrating and then cooling crystallizing the metal salt-recovered lithium-containing waste liquid. The concentration is preferably concentrating to 70%, but is not limited thereto.

The cooling crystallization uses a difference in the solubility between sodium sulfate and lithium sulfate, and may be conducted without treating with additional materials. The cooling crystallization for removing the sodium sulfate may be conducted in a temperature range of 0° C. to 10° C., and is preferably conducted in a temperature range of 2° C. to 5° C. When the tempera tare is higher than 10° C., solubility of $Na_2SO_4$ increases making it difficult to separate $Na_2SO_4$, and therefore, it is preferred to remove $Na_2SO_4$ through precipitation filter after lowering solubility of $Na_2SO_4$ at a temperature of 10° C. or lower.

(2) Obtaining Lithium Hydroxide by Reacting the Lithium Sulfate with Calcium Hydroxide The method for producing lithium hydroxide of the present disclosure includes obtaining lithium hydroxide by, reacting the lithium sulfate with calcium hydroxide.

In the present disclosure, it is preferred that the lithium sulfate and the calcium hydroxide are added in the same number of moles and reacted at room temperature. When increasing the temperature for enhancing reactivity, solubility of the calcium hydroxide decreases, and large quantities of unreacted substances are present due to the undissolved calcium hydroxide, which reduces the final yield.

In the present disclosure, the calcium hydroxide has better reactivity with lithium than barium hydroxide resulting, in a short reaction time, no unreacted calcium materials remaining, and a high yield of produced lithium hydroxide.

The lithium sulfate obtained from the lithium-containing waste liquid may have a pH of 6 or less, preferably has a pH of 4.5 to 6, and most preferably has a pH of 5 to 6. Since an additional step for adjusting the pH is not required in this step, there is an advantage of simplifying the process of the method for producing lithium hydroxide of the present disclosure. Calcium hydroxide has low solubility for water, however, when the aqueous lithium sulfate solution satisfies the pH of 6 or less excellent solubility and reactivity may be obtained without adding an additional solvent such as glycerin. When the lithium sulfate has a pH of greater than 6, the calcium hydroxide added to be reacted with the lithium sulfate is not dissolved, rapidly reducing reactivity with sulfur ions, and accordingly, yield and purity of lithium hydroxide are reduced. In addition, artificially lowering the pH results in decreases in purity and yield, and artificially increasing the pH leads to an increase in the Na content, resulting in problems of impurities and decreases in purity/yield.

In the present disclosure, there are no separate additives for dissolving the calcium hydroxide in water, and therefore, an additional process for removing additives is not required, which simplifies the process. For example, when adding glycerin to dissolve the calcium hydroxide in water, spray drying is required at a high temperature of 290° C. or higher to remove the glycerin, and since it is difficult to completely remove the glycerin even by spray drying, purity of lithium hydroxide may be reduced.

As shown in FIG. 1, solubility of calcium hydroxide for water decreases as a temperature increases and reactivity with lithium sulfate increases, and therefore, the reaction of the lithium sulfate with calcium hydroxide is preferably conducted at room temperature, and is most preferably conducted at approximately 20° C.

The obtaining of lithium hydroxide may further include producing an aqueous lithium hydroxide solution and calcium sulfate by reacting the lithium sulfate with calcium hydroxide, and removing the calcium sulfate by a filtration process.

The obtaining of lithium hydroxide may thither include obtaining lithium hydroxide powder by precipitating the lithium hydroxide using a precipitant, and specifically, a precipitant may be added to the aqueous lithium hydroxide solution for precipitation, and the result is dried to obtain lithium hydroxide powder.

In addition, the precipitation and the drying may be conducted in a temperature range of 10° C. to 30° C., preferably conducted in a temperature range of 15° C. to 25° C., and most preferably conducted at room temperature of approximately 20° C. The temperature of higher than 30° C. is not preferred since solubility of the calcium sulfate increases making it difficult to separate the calcium sulfate, and the temperature of lower than 10° C. is not preferred since materials other than the calcium sulfate such as metal salts may be precipitated together.

Examples of the precipitant may include alcohols such as isopropanol, butanol and pentanol.

(3) Pretreating for Preparing Lithium-Containing Waste Liquid

In the method for producing lithium hydroxide of the present disclosure, the lithium-containing waste liquid may be obtained from a spent lithium secondary battery, and, in order to obtain the lithium-containing waste liquid, a process of immediately crushing a spent lithium secondary battery and then heat treating the result may be further included.

The pretreatment process may further include discharging the spent lithium secondary battery before crushing. When completing the discharge, the subsequent process of recovering valuable metals may also be stably conducted in the atmosphere rather than in the inert atmosphere. The discharge may be conducted in a discharge solution. As the discharge solution, distilled water may be used. The degree of completion of the discharge may be identified through a decrease in the voltage with time. An electrolyte in the spent lithium secondary battery is mostly removed in the discharge process.

The crushing may be conducted by milling. The milling may be mechanical milling, and specifically, may be one or more types selected from the group consisting of roll-mill, ball-mill, jet-mill, planetary-mill and attrition-mill.

The crushed material may have a particle diameter of 1 μm to 15 μm, may preferably have a particle diameter of 1 μm to 7 μm and may more preferably have a particle diameter of 2 μm to 5 μm.

The pretreatment process may further include sorting after the crushing. The crashed material is separated into a large fraction of fine electrode composite powder and other components (positive electrode, negative electrode, separator) by the sorting process, preferably by sorting with a sieve, and the electrode composite powder is recovered from the crushed material.

The pretreatment process may further include gravity separating after the sorting. By gravity separating the crushed material using, preferably, a water level-installed rinse tank, a separator in the crushed material is removed, and an electrode composite, a separator, a current collector and the like may be separated.

The pretreatment process may further include magnetic separating after the gravity separating. When the spent lithium secondary battery further includes stainless steel (SUS), the stainless steel (SUS) is selectively removed from the crushed material by the magnetic separation.

In the pretreatment process, heat treatment may be conducted after the magnetic separation. The heat treatment is to remove impurities other than the positive electrode active material included in the spent lithium secondary battery such as a positive electrode binder, a positive electrode conductor, a negative electrode active material, a negative electrode binder, a negative electrode conductor and a pouch, and may be conducted in a temperature range of 600° C. to lower than 1000° C., may be preferably conducted in a temperature range of 700° C. to 900° C. and may be more preferably conducted in a temperature range of 800° C. to 900° C. When the heat treatment temperature is higher than 1000° C., even lithium of the positive electrode active material may be removed.

In addition, the pretreatment process may include, after the heat treatment, a process of further removing remaining impurities such as a carbon material (negative electrode active material) and copper by mixing sulfuric acid with the pretreated material.

The spent lithium secondary battery includes a positive electrode, a negative electrode, a separator and an electrolyte, and may further include a pouch. Specifically, the spent lithium secondary battery includes a separator provided between a negative electrode and a positive electrode, and an electrolyte liquid including an electrolyte supplied thereto. More specifically, the spent lithium secondary battery described above may be manufactured by, for example, consecutively laminating the negative electrode, the separator and the positive electrode, then winding or folding the result to put into a cylindrical or prismatic battery case or pouch, and then injection an organic electrolyte liquid to the battery case or pouch.

The positive electrode of the spent lithium secondary battery may include lithium metal or a lithium transition metal oxide, and may be prepared using methods commonly known in the art. For example, the positive electrode may be prepared by mixing a solvent, and, as necessary, a binder, a conductor and a dispersant to a positive electrode active material and stirring the result to prepare slurry, then applying (coating) the slurry on a positive electrode current collector, and compressing and then drying the result.

Examples of the positive electrode active material may include one or more types selected from the group consisting of $LiCoO_2$, $LiNiO_2$, $LiMnO_2$, $LiMn_2O_4$, $Li(Ni_xCo_yMn_z)O_2$ (herein, $0<x<1$, $0<y<1$, $0<z<1$, and $x+y+z=1$), $LiNi_{1-a}CoO_2$ (herein, $0\leq a<1$), $LiCo_{1-b}Mn_bO_2$ (herein, $0\leq b<1$), $LiNi_{1-c}Mn_cO_2$ (herein, $0\leq c<1$), $LiMn_{2-d}Ni_dO_4$ (herein, $0<d<2$), $LiMn_{2-e}Co_eO_4$ (herein, $0<e<2$), $LiCoPO_4$, $LiFePO_4$ and combinations thereof, but are not limited thereto.

As the solvent of the positive electrode, N-methyl-2-pyrrolidone (NMP), acetone, water or a mixture thereof may be used, and as the conductor of the positive electrode, a conductive auxiliary material such as polyacrylic acid, acetylene black, furnace black, graphite, carbon fiber or fullerene, and the like may be used.

The binder of the positive electrode performs a role of fully attaching particles of the positive electrode active material and also fully attaching the positive electrode active material to the positive electrode current collector, and examples of the hinder may include polyacrylic acid, polyvinylidene fluoride, polyvinyl alcohol, carboxyl methyl cellulose (CMC), starch, hydroxyl propyl cellulose, regenerated cellulose, polyvinyl pyrrolidone, tetrafluoroethylene, polyethylene, polypropylene, an ethylene-propylene-diene terpolymer (EPDM), a sulfonated EPDM, styrene-butadiene rubber, fluoro rubber, various copolymers or the like.

The positive electrode current collector has a thickness of approximately 3 μm to approximately 500 μm, and is not particularly limited as long as it has high conductivity without inducing chemical changes to the corresponding battery. For example, stainless steel, aluminum, nickel, titanium, heat treated carbon, aluminum or stainless steel of which surface is treated with a material selected from the group consisting of carbon, nickel, titanium, silver and combinations thereof may be used. The current collector may increase adhesive strength with the positive electrode active material by forming micro unevenness on the surface, and various forms such as films, sheets, foil, nets, porous bodies, foams or non-woven fabrics may be used.

The negative electrode of the spent lithium secondary battery may be prepared using methods commonly known in the art. For example, the negative electrode may be prepared by mixing a solvent, and, as necessary, a binder, a conductor and a dispersant to a negative electrode active material and stirring the result to prepare slurry, then applying (coating) the slurry on a negative electrode current collector, and compressing and then drying the result.

The negative electrode active material may commonly be a carbon material capable of intercalating and deintercalating lithium ions, lithium metal, silicon tin or the like. The negative electrode active material may preferably be a carbon material, and as the carbon material, low crystalline carbon, high crystalline carbon and the like may be included. Representative examples of the low crystalline carbon may include soft carbon and hard carbon, and representative examples of the high crystalline carbon may include natural graphite, kish graphite, pyrolytic carbon, mesophase pitch-based carbon fiber, meso-carbon microbeads, mesophase pitches and high temperature baked carbon such as petroleum or coal tar pitch derived cokes.

As the solvent of the negative electrode, N-methyl-2-pyrrolidone (NMP), acetone, water or a mixture thereof may be used, and as the conductor of the negative electrode, a conductive auxiliary material such as polyacrylic acid, acetylene black, furnace black, graphite, carbon fiber or fullerene and the like may be used.

The binder of the negative electrode performs a role of fully attaching particles of the negative electrode active material and also fully attaching the negative electrode active material to the current collector, and examples of the binder may include polyacrylic acid, polyvinylidene fluoride, polyvinyl alcohol, carboxyl methyl cellulose (CMC), starch, hydroxyl propyl cellulose, regenerated cellulose, polyvinyl pyrrolidone, tetrafluoroethylene, polyethylene, polypropylene, an ethylene-propylene-diene terpolymer (EPDM), a sulfonated EPDM, styrene-butadiene rubber, fluoro rubber, various copolymers or the like.

The negative electrode current collector is generally made to have a thickness of approximately 3 μm to approximately 500 μm. Such a negative electrode current collector is not particularly limited as long as it has conductivity without inducing chemical changes to the corresponding battery. For example, copper, stainless steel, aluminum, nickel, titanium, heat treated carbon, copper or stainless steel of which surface is treated with carbon, nickel, titanium or silver, or aluminum-cadmium alloys may be included. In addition, like the positive electrode current collector, the negative electrode current collector may also strengthen binding strength with the negative electrode active material by forming micro unevenness on the surface, and various forms such as films, sheets, foil, nets, porous bodies, foams or non-woven fabrics may be used.

The separator of the spent lithium secondary battery is not limited in the type, and, for example, a porous substrate prepared with a polyolefin-based polymer selected from the group consisting of an ethylene homopolymer, a propylene homopolymer, an ethylene-butene copolymer, an ethylene-hexene copolymer and an ethylene-methacrylate copolymer; a porous substrate prepared with a polymer selected from the group consisting of polyester, polyacetal, polyamide, polycarbonate, polyimide, polyetheretherketone, polyethersulfone, polyphenylene oxide, polyphenylene sulfite and polyethylene naphthalene; a porous substrate formed with a mixture of inorganic particles and a binder polymer, or the like, may be used. Particularly, in order for lithium ions of the ion supply core portion to be readily transferred to the external electrode, a separator made of non-woven fabrics corresponding to the porous substrate prepared with a polymer selected from the group consisting of polyester, polyacetal, polyamide, polycarbonate, polyimide, polyetheretherketone, polyethersulfone, polyphenylene oxide, polyphenylene sulfite, polyethylene naphthalene and combinations thereof is preferably used.

The separator has a pore size of approximately 0.01 μm to approximately 10 μm, and generally has a thickness of approximately 5 μm to approximately 300 μm. As the electrolyte of the spent lithium secondary battery, a gel-type polymer electrolyte using PEO, PVdF, PVdF-HFP, PMMA PAN or PVAC; a solid electrolyte using PEO, PPO (polypropylene oxide), PEI (polyethylene imine), PES (polyethylene sulfide) or PVAc (polyvinyl acetate), or the like, may be used as an example. In addition, as the electrolyte, a non-aqueous electrolyte liquid using ethylene carbonate (EC), propylene carbonate (PC), butylene carbonate (BC), vinylene carbonate (VC), diethyl carbonate (DEC), dimethyl carbonate (DMC), ethylmethyl carbonate (EMC), methyl formate (MF), gamma (γ)-butyrolactone (γ-BL), sulfolane, methyl acetate (MA) or methyl propionate (MP) may also be used. In addition, the electrolyte may further include a lithium salt, and examples of such a lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate or the like.

In one embodiment of the present application, an organic solid electrolyte and/or an inorganic solid electrolyte may be used in addition to the separator in the spent lithium secondary battery, however, the use is not limited thereto. Herein, when using the organic solid electrolyte and/or the inorganic solid electrolyte, the solid electrolyte may also serve as a separator in some cases, and the separator described above may not be used.

Examples of the organic solid electrolyte may include polyethylene derivatives, polyethylene oxide derivatives, polypropylene oxide derivatives, phosphoric ester polymers, polyvinyl alcohol or polyvinylidene fluoride, but are not limited thereto. The inorganic solid electrolyte may be selected from the group consisting of, for example, $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$ and combinations thereof, but is not limited thereto.

Hereinafter, the present disclosure will be described in more detail with reference to examples. However, the following examples are for more specifically describing the present disclosure, and the scope of the present disclosure is not limited to the following examples.

Examples 1 to 3

A positive electrode material separated from a spent lithium secondary battery was crushed and pulverized. The obtained powder was reacted with a sulfuric acid solution for 6 hours or longer to obtain a leachate including Li. From the leachate including Li, manganese, cobalt and nickel were separated and recovered through solvent extraction and precipitation methods, and a lithium-containing waste liquid was obtained.

When recovering the necessary metals through solvent extraction, the optimum extraction condition was obtained at =pH 4 for Mn, the optimum extraction condition was identified at =pH 5 for Co, and the optimum extraction condition was obtained at <pH 6 for Ni. Accordingly, manganese, cobalt or nickel was extracted under the above-mentioned pH conditions, and herein, the obtained lithium-containing waste liquid had the pH adjusted to each of pH 5.5, 4.5 and 4 by the sulfuric acid solution used when extracting the metal salts.

Subsequently, the obtained lithium-containing waste liquid was evaporation concentrated to 70 w/v % and then cooling crystallized at 5° C. to precipitate $Na_2SO_4$, and the $Na_2SO_4$ was filtered and removed to obtain an aqueous lithium sulfate ($LiSO_4 \cdot H_2O$) solution. Herein, the obtained aqueous lithium sulfate solution having a pH of 5.5 was employed as Example 1, having a pH of 4.5 was employed as Example 2, and having a pH of 4 was employed as Example 3.

Using the obtained aqueous lithium sulfate solution as a starting material, calcium hydroxide ($Ca(OH)_2$) powder (4.0 g) was added to the aqueous lithium sulfate solution (1000 mL) as an additive, and they were reacted at room temperature. By the reaction, calcium sulfate ($CaSO_4 \cdot H_2O$) precipitates and lithium hydroxide (LiOH) solution were obtained. The precipitated calcium sulfate was removed by filtration, and after precipitating lithium hydroxide by adding isopropanol thereto at room temperature, the result was dried to obtain lithium hydroxide powder.

Comparative Example 1

Lithium sulfate monohydrate and deionized water (demineralized water) were stirred to obtain an aqueous lithium sulfate solution. After adding barium hydroxide (13.8 g) to the aqueous lithium sulfate solution (1000 mL) as an additive, the result was stirred and reacted, and then filtered. Herein, the barium hydroxide was introduced in the same number of moles as the lithium sulfate. After the filtration, the filtrate was spray dried at 150° C. to 200° C. to obtain lithium hydroxide powder.

Comparative Example 2

Lithium sulfate monohydrate and deionized water (demineralized water) were stirred to obtain an aqueous lithium sulfate solution. To the aqueous lithium sulfate solution (1000 mL), glycerin was added to enhance calcium hydroxide solubility, and calcium hydroxide powder (4.0 g) was added thereto as an additive. The result was stirred and produced precipitates were separated. The filtrate from which the precipitates were removed was spray dried at a temperature of 290° C. or higher to remove the glycerin, and lithium hydroxide powder was obtained.

In Comparative Examples 1 and 2, artificially lowering the pH results in decreases in purity and yield, and increasing the pH leads to an increase in the Na content, resulting in problems of impurities and decreases in purity/yield.

Comparative Example 3

Lithium hydroxide powder was prepared under the same condition as in the examples except that an aqueous lithium sulfate solution having a pH of 6.5 was used.

Experimental Example 1: Comparison Depending on Additive

In this experimental example, purity and yield of the lithium hydroxide depending on the type of the additive added for the reaction with the lithium sulfate, and reactivity of the lithium sulfate and the additive were evaluated, and the results are shown in the following Table 1.

TABLE 1

| | Additive | Purity (%) | Yield (%) | Purity | Yield | Reactivity |
|---|---|---|---|---|---|---|
| Comparative Example 1 | $Ba(OH)_2$ | 94.9 | 64.1 | Δ | Δ | Δ |
| Comparative Example 2 | $Ca(OH)_2$ | 97.4 | 90.6 | Δ | ○ | ○ |
| Example 1 | $Ca(OH)_2$ | 99.9 | 95.1 | ⊚ | ⊚ | ⊚ |

Experimental Example 2: Comparison Depending on pH of Lithium Sulfate

In this experimental example, purity and yield of the lithium hydroxide depending on the pH condition of the lithium sulfate, and reactivity of the lithium sulfate and the additive were evaluated, and the results are shown in the following Table 2.

TABLE 2

| | Additive | pH | Purity (%) | Yield (%) | Purity | Yield | Reactivity |
|---|---|---|---|---|---|---|---|
| Comparative Example 3 | $Ca(OH)_2$ | 6.5 | 97.3 | 62.8 | Δ | Δ | Δ |
| Example 1 | | 5.5 | 99.9 | 95.1 | ⊚ | ⊚ | ⊚ |
| Example 2 | | 4.5 | 98.2 | 76.9 | ○ | ○ | ○ |
| Example 3 | | 4 | 98.0 | 75.4 | ○ | ○ | ○ |

Evaluation criteria for purity, yield and reactivity of Table 1 and Table 2 are as follows. Herein, purity means excluding the content of Ca, an impurity, from the total content.

<Evaluation Criteria for Purity>

⊚: when purity of lithium hydroxide is 99.9% or greater

○: when purity of lithium hydroxide is from 98.0% to 99.8%

Δ: when purity of lithium hydroxide is less than 98.0%

<Evaluation Criteria for Yield>

⊚: when yield of lithium hydroxide is greater than 95.0%

○: when yield of lithium hydroxide is from 75.0% to 95.0%

Δ: when yield of lithium hydroxide is less than 75%

<Evaluation Criteria for Reactivity>

⊚: yield of greater than 95% in 4 hours of reaction time

○: yield of 75% to 95% in 4 hours of reaction time

Δ: yield of less than 75% in 4 hours of reaction time

Referring to Tables 1 and 2, Comparative Example 1 using barium hydroxide as an additive had a problem of Ba remaining in the solution since the reaction time is long, and Comparative Example 2 in which glycerin was added had a problem of Ca remaining since $CaSO_4$ produced after the reaction was partially dissolved in the added glycerol, and it was identified that both Comparative Examples 1 and 2 had problems of decreases in the lithium hydroxide purity and yield. Meanwhile, when the pH was 6.5 or greater as in Comparative Example 3, $Ca(OH)_2$ was not favorably dissolved, and it was identified that the yield of the lithium hydroxide decreased since reactivity of lithium sulfate and calcium hydroxide rapidly decreased, and the purity of the lithium hydroxide was also reduced by unreacted substances.

On the other hand, when calcium hydroxide was as an additive and the aqueous lithium sulfate solution had a pH of 6 or less as in Examples 1 to 3 of the present disclosure, lithium sulfate and calcium hydroxide had superior reactivity without an additive such as glycerin, and accordingly, a high yield was obtained since there was no decrease in the purity caused by remaining metals or remaining additives and there was no side reaction. Particularly, purity and yield were most superior when using the aqueous lithium sulfate solution having a pH of 5.5.

What is claimed is:

1. A method for producing lithium hydroxide, the method comprising:

recovering one or more types of metal salts selected from among manganese, nickel, and cobalt from a spent lithium secondary battery to obtain a lithium (a single dash) containing waste liquid;

obtaining aqueous lithium sulfate solution from the lithium-containing waste liquid; and obtaining lithium hydroxide by reacting the aqueous lithium sulfate solution with calcium hydroxide, wherein the method does not include the step of adding barium hydroxide, and wherein the aqueous lithium sulfate solution obtained from the lithium-containing waste liquid has a pH of 6 or less.

2. The method of claim 1, wherein a solvent is not added in the obtaining of lithium hydroxide.

3. The method of claim 1, wherein glycerin is not added in the step of obtaining the lithium hydroxide.

4. The method of claim 1, further comprising obtaining lithium hydroxide powder by precipitating the obtained lithium hydroxide using a precipitant.

5. The method of claim 4, wherein the precipitant is an alcohol.

6. The method of claim 1, further comprising removing sodium sulfate ($Na_2SO_4$) by evaporation concentrating and then cooling crystallizing the metal salt-recovered lithium-containing waste liquid.

* * * * *